United States Patent
Gilmour et al.

(10) Patent No.: US 11,310,473 B2
(45) Date of Patent: *Apr. 19, 2022

(54) GENERATING VIDEOS WITH SHORT AUDIO

(71) Applicant: GoPro, Inc., San Mateo, CA (US)

(72) Inventors: Nicholas Ryan Gilmour, San Jose, CA (US); David Newman, San Diego, CA (US); Vadim Polonichko, San Diego, CA (US); Tyler Gee, San Francisco, CA (US); Jessica Bonner, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/083,705

(22) Filed: Oct. 29, 2020

(65) Prior Publication Data

US 2021/0044786 A1   Feb. 11, 2021

Related U.S. Application Data

(63) Continuation of application No. 16/409,499, filed on May 10, 2019, now Pat. No. 10,827,157.

(51) Int. Cl.
| | |
|---|---|
| *H04N 9/802* | (2006.01) |
| *G11B 27/00* | (2006.01) |
| *G11B 27/036* | (2006.01) |
| *H04N 5/225* | (2006.01) |

(52) U.S. Cl.
CPC .......... *H04N 9/802* (2013.01); *G11B 27/005* (2013.01); *G11B 27/036* (2013.01); *H04N 5/2252* (2013.01)

(58) Field of Classification Search
CPC .... H04N 9/802; H04N 5/2252; G11B 27/005; G11B 27/036
See application file for complete search history.

(56) References Cited

U.S. PATENT DOCUMENTS

| | | | |
|---|---|---|---|
| 10,372,991 B1* | 8/2019 | Niemasik | G06F 16/583 |
| 2005/0042591 A1 | 2/2005 | Bloom | |
| 2007/0160349 A1* | 7/2007 | Hayashi | H04N 5/76 386/230 |
| 2008/0165388 A1 | 7/2008 | Serlet | |
| 2011/0019972 A1 | 1/2011 | Ido | |
| 2011/0199496 A1* | 8/2011 | Muraki | H04N 5/772 348/218.1 |
| 2014/0085538 A1 | 3/2014 | Kaine | |
| 2014/0212107 A1 | 7/2014 | Saint-Jean | |
| 2015/0012270 A1 | 1/2015 | Reynolds | |
| 2015/0222682 A1* | 8/2015 | Lewis | H04N 21/854 715/719 |
| 2016/0021042 A1* | 1/2016 | Alfieri | H04L 51/10 709/206 |
| 2017/0323663 A1* | 11/2017 | Boykin | G08B 13/19656 |
| 2017/0339320 A1 | 11/2017 | Jing | |
| 2018/0268866 A1* | 9/2018 | Takahashi | H04N 21/8549 |

* cited by examiner

*Primary Examiner* — Sunghyoun Park
(74) *Attorney, Agent, or Firm* — Esplin & Associates, PC

(57) ABSTRACT

An image capture device may capture visual content during a visual capture duration and audio content during an audio capture duration. The audio capture duration may be shorter than the visual capture duration. The captured audio content may provide audio for playback of the captured visual content.

14 Claims, 8 Drawing Sheets

GENERATING VIDEOS WITH SHORT AUDIO

FIELD

This disclosure relates to generating videos with short audio.

BACKGROUND

Time-lapse capture of visual content may enable playback in which time appears to be moving at a fast rate. Lack of audio content in playback of such content may decrease user engagement with the content.

SUMMARY

This disclosure relates to generating videos with short audio. An image capture device may include a housing. The housing may carry one or more of an image sensor, an optical element, a sound sensor, and/or other components. The image sensor may generate a visual output signal conveying visual information defining visual content based on light guided thereto by the optical element. The sound sensor may generate a sound output signal conveying audio information defining audio content based on sound received by the sound sensor. The visual content may be captured during a visual capture duration extending from a visual capture start point to a visual capture end point. The audio content may be captured during an audio capture duration extending from an audio capture start point to an audio capture end point. The audio capture duration may be shorter than the visual capture duration. Video content of a video may be generated to include the captured visual content and the captured audio content. The captured visual content may be defined within video frames of the video content and the captured audio content may provide audio for playback of at least some of the video frames.

An electronic storage may store visual information defining visual content, information relating to visual content, audio information defining audio content, information relating to audio content, information relating to capture of visual content, information relating to capture of audio content, information relating to video content, information relating to generation of video content, and/or other information.

The housing may carry one or more components of the image capture device. The housing may carry (be attached to, support, hold, and/or otherwise carry) one or more of an image sensor, an optical element, a sound sensor, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. The field of view may be greater than 180 degrees.

The sound sensor may be configured to generate a sound output signal and/or or output signals. The sound output signal may convey audio information based on sound received by the sound sensor. The audio information may define audio content.

The processor(s) may be configured by machine-readable instructions. Executing the machine-readable instructions may cause the processor(s) to facilitate generation of videos with short audio. The machine-readable instructions may include one or more computer program components. The computer program components may include one or more of a visual content component, an audio content component, a video content component, and/or other computer program components.

The visual content component may be configured to capture the visual content during one or more visual capture durations. A visual capture duration may extend from a visual capture start point to a visual capture end point. Capturing the visual content may include recording, storing, and/or otherwise capturing the visual content for use in generating video content. Capturing the visual content may be separate from use of the visual content for other purposes, such as monitoring and/or analyzing the visual content for detecting one or more moments of interest.

The audio content component may be configured to capture the audio content during one or more audio capture durations. An audio capture duration may extend from an audio capture start point to an audio capture end point. Capturing the audio content may include recording, storing, and/or otherwise capturing the audio content for use in generating video content. Capturing the audio content may be separate from use of the audio content for other purposes, such as monitoring and/or analyzing the audio content for detecting one or more moments of interest.

For example, the audio content component may capture the audio content during a first audio capture duration, which may extend from a first audio capture start point to a first audio capture end point. The first audio capture duration may be shorter than the visual capture duration. The audio content component may capture the audio content during a second audio capture duration, which may extend from a second audio capture start point to a second audio capture end point.

In some implementations, an audio capture start point may coincide with a visual capture start point and an audio capture end point may precede a visual capture end point. In some implementations, an audio capture start point may follow a visual capture start point and an audio capture end point may coincide with a visual capture end point. In some implementations, an audio capture start point may follow a visual capture start point and an audio capture end point may precede a visual capture end point.

In some implementations, the audio content may be captured based on identification of one or more depictions of interest within the visual content and/or other information. In some implementations, the audio content may be captured based on identification of one or more sounds of interest within the audio content and/or other information. In some implementations, the audio content may be captured based on activation of one or more narration options of the image capture device.

The video content component may be configured to generate video content of one or more videos. A video may include a time-lapse video. A time-lapse video may have a visual content playback rate that is faster than a visual content capture rate.

The video content may include the captured visual content, the captured audio content, and/or other content. The captured visual content may be defined within one or more video frames of the video content. The captured audio content may provide audio for playback of at least some of the video frames.

In some implementations, the captured audio content may include a first captured audio content portion, a second captured audio content portion, and/or other captured audio content portions. The first captured audio content portion may be captured during the first audio capture duration and the second captured audio content portion may be captured during the second audio capture duration.

In some implementations, the first captured audio content portion may be mixed with the second captured audio content portion to provide the audio for playback of at least some of the video frames.

In some implementations, the first captured audio content portion may provide the audio for playback of a first subset of the video frames and the second captured audio content portion may provide the audio for playback of a second subset of the video frames.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
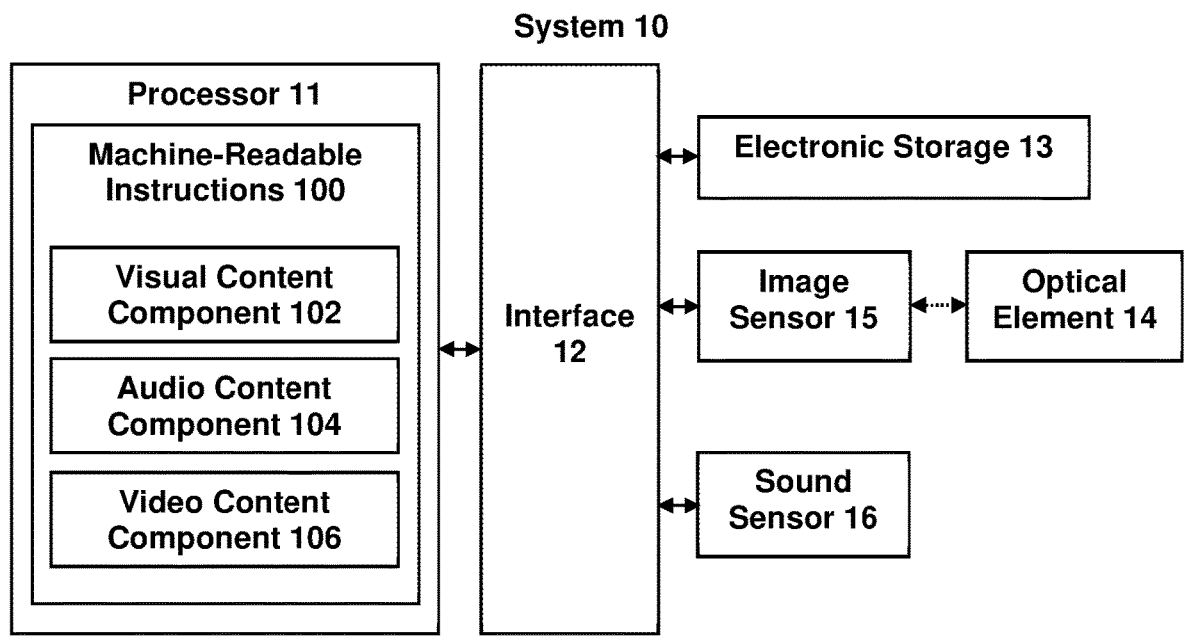
FIG. 1 illustrates an example system that generates videos with short audio.

FIG. 1 illustrates a system 10 for generating videos with short audio. The system 10 may include or be part of an image capture device. The system 10 may include one or more of a processor 11, an interface 12 (e.g., bus, wireless interface), an electronic storage 13, an optical element 14, an image sensor 15, a sound sensor 16, and/or other components. One or more components of the system 10 may be carried by a housing of an image capture device. The image sensor 15 may generate a visual output signal conveying visual information defining visual content based on light guided thereto by the optical element 14. The sound sensor 16 may generate a sound output signal conveying audio information defining audio content based on sound received by the sound sensor. The processor 11 may capture the visual content during a visual capture duration and the audio content during an audio capture duration. The visual capture duration may extend from a visual capture start point to a visual capture end point, and the audio capture duration may extend from an audio capture start point to an audio capture end point. The audio capture duration may be shorter than the visual capture duration. The processor 11 may generate video content of a video to include the captured visual content and the captured audio content. The captured visual content may be defined within video frames of the video content and the captured audio content may provide audio for playback of at least some of the video frames.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, audio information defining audio content, information relating to audio content, information relating to capture of visual content, information relating to capture of audio content, information relating to video content, information relating to generation of video content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be defined within one or more images and/or one or more video frames of a video. For instance, video frame(s) of a video may define the visual content of the video. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Figure 3:
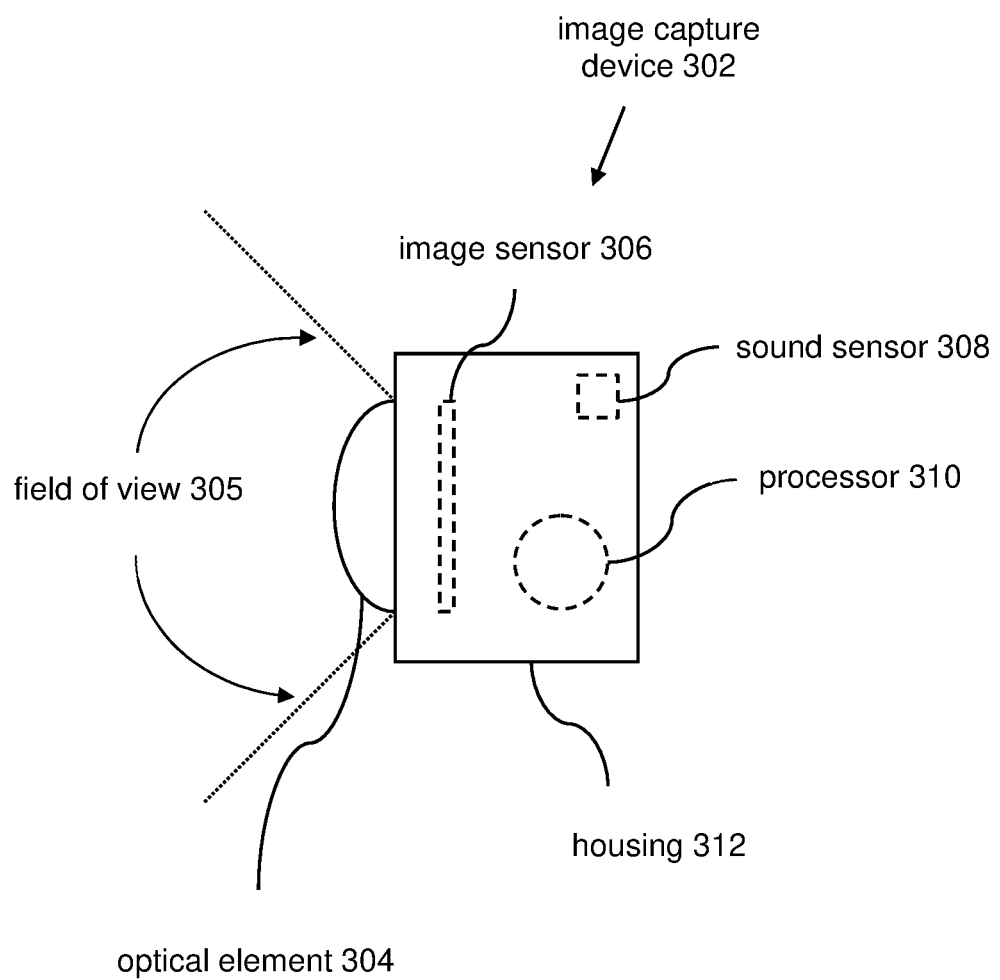
FIG. 3 illustrates an example image capture device.

An image capture device may refer to a device captures visual content. An image capture device may capture visual content in form of images, videos, and/or other forms. For example, an image capture device may refer to a camera and/or an image sensor. FIG. 3 illustrates an example image capture device 302. Visual content (e.g., of image(s), video frame(s)) may be captured by the image capture device 302. The image capture device 302 may include a housing 312, and the housing 312 may carry (be attached to, support, hold, and/or otherwise carry) one or more of an optical element 304, an image sensor 306, a sound sensor 308, a processor 310, and/or other components. Other configurations of image capture devices are contemplated.

One or more components of the image capture device 302 may be the same as, be similar to, and/or correspond to one or more components of the system 10. For example, the optical element 304 may be the same as, be similar to, and/or correspond to the optical element 14. The image sensor 306 may be the same as, be similar to, and/or correspond to the image sensor 15. The sound sensor 308 may be the same as, be similar to, and/or correspond to the sound sensor 16. The processor 308 may be the same as, be similar to, and/or correspond to the processor 11.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate visual output signals conveying visual information (defining visual content of images and/or videos) based on light that becomes incident thereon and/or other information. The optical element 304 may be configured to guide light within the field of view 305 to the image sensor 306, and the image sensor 306 may be configured to generate visual output signals conveying visual information based on light that becomes incident thereon via the optical element 304.

The sound sensor 308 include sensor(s) that converts received sounds into output signals. The output signals may include electrical signals. The sound sensor 308 may generate output signals conveying information based on the received sounds. For example, sound sensor 308 may be configured to generate a sound output signal conveying audio information based on the received sounds. The audio information may define audio content. The audio content may include one or more reproductions of the received sounds. The audio information may define audio content in one or more formats, such as WAV, MP3, MP4, RAW. The audio information may be stored in one or more locations, such as an electronic storage, storage of the sound sensor 308, remote storage, and/or other locations. While the sound sensor 308 is shown to be carried by the housing 312 in FIG. 3, this is merely an example and is not meant to be limiting. The sound sensor 308 may be remote/separate from the image capture device 302.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the sound sensor 308 (e.g., change how the received sound is converted into information that defines audio content and/or how the audio content post-processed after capture).

The processor 310 may obtain information from the image sensor 306 and/or the sound sensor 308, and/or facilitate transfer of information from the image sensor 306 and/or the sound sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may include other sensors, such as one or more motion sensors. A motion sensor may refer to one or more sensors that converts experienced motions into output signals. The output signals may include electrical signals. A motion sensor may generate output signals conveying information that characterizes motions and/or positions of the motion sensor and/or device(s) carrying the motion sensor, such as the image capture device

302. The motions/positions characterized by a motion sensor may include translational motions/positions and/or rotational motions/positions. For example, a motion sensor may refer to a set of motion sensors, which may include one or more inertial measurement units, one or more accelerometers, one or more gyroscopes, and/or other motion sensors.

The image capture device 302 may capture visual content during a visual capture duration and may capture audio content during an audio capture duration. The visual content, the audio content, and/or other content may be captured by the image capture device 302 for generation of video content. The audio capture duration may be different from/shorter than the visual capture duration. That is, the image capture device 302 may capture visual content (e.g., of images, video frames) over a time span that is longer than a time span during which the image capture device 302 captures audio content. The captured visual content and the captured audio content may be used to generate video content of a video. For example, captured visual content may be used to generate video frames of a time-lapse video, and the captured audio content may provide audio for playback of some or all of the video frames of the time-lapse video.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generation of videos with short audio. The machine-readable instructions 100 may include one or more computer program components. The machine-readable instructions 100 may include one or more of a visual content component 102, an audio content component 104, a video content component 106, and/or other computer program components.

The visual content component 102 may be configured to capture the visual content during one or more visual capture durations. A visual capture duration may refer to a time duration in which visual content is captured. A visual capture duration may extend from a visual capture start point to a visual capture end point. A visual capture duration may span a time duration that starts at the visual capture start point and ends at the visual capture end point.

Capturing visual content during a visual capture duration may include recording, storing, and/or otherwise capturing the visual content for use in generating video content. For example, during a visual capture duration, the visual content component 102 may use the visual output signal generated by the image sensor 15 and/or the visual information conveyed by the visual output signal to record, store, and/or otherwise capture the visual content for use in generating video content. The visual content component 102 may use the visual output signal generated by the image sensor 15 and/or the visual information conveyed by the visual output signal during a visual capture duration to record, store, and/or otherwise capture the visual content for use in generating video content. For instance, the visual content component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the visual capture duration. Information defining the captured visual content may be stored in one or more visual tracks.

The visual content component 102 may be configured to capture the visual content using a visual content capture rate and/or other information. A visual content capture rate may refer to a frequency at which the visual content is captured. For example, a visual content capture rate may define a number of images/video frames that are captured per a time duration (e.g., # frames per second). A visual content playback rate may refer to a frequency at which the visual content is display. For example, a visual content playback rate may define a number of images/video frames that are displayed per a time duration (e.g., # frames per second).

In some implementations, a visual content capture rate at which the visual content is captured by the visual content component 102 may be more spread out than a visual content playback rate of the video content generated from the captured visual content. That is, the visual content capture rate may be lower than the visual content playback rate. For example, the visual content may be captured at a visual content capture rate of 1 video frame per second while the video content generated from the captured visual content may be played at visual content playback rate of 30 video frames per second. Such a difference in the visual content capture rate and the visual content playback rate may make the video content to appear to be played with a 30× increase in speed. Such a difference in the visual content capture rate and the visual content playback rate may facilitate generation of a time-lapse video using the captured visual content. Other visual content capture rate and visual content playback rate are contemplated.

Capture of the visual content by the visual content component 102 during a visual capture duration may be separate from use of the visual content for other purposes, such as monitoring and/or analyzing the visual content for detecting one or more moments of interest. For example, a feed of visual content (e.g., of images, video frames) conveyed by the visual output signal may be monitored, analyzed, and/or otherwise used to detect the occurrence of one or more events of interest. An event of interest may refer to a thing of interest to one or more persons. One or more events of interest may be captured within the visual content (e.g., the visual content including depictions of events of interest and/or the visual content including depictions indicating occurrences of events of interest). An event of interest may occur during a moment of interest. A moment of interest may include one or more points of time and/or one or more durations of time.

In some implementations, one or more visual capture durations may be determined based on detection of one or more events of interest. For example, a visual capture start point and/or a visual capture end point of a visual capture duration may be set based on detection of an event of interest. For instance, a visual capture start point may be set to coincide with or precede the beginning of a moment of interest and a visual capture end point may be set to coincide with or follow the end of the moment of interest. Visual content generated by the image sensor 15 may be temporarily stored for detection of events of interest (e.g., in one or more buffers). Visual content generated by the image sensor 15 outside a visual capture duration may be deleted and/or otherwise removed from electronic storage (e.g., after monitoring/analysis of the visual content).

In some implementation, the visual content capture rate at which the visual content is captured by the visual content component 102 may be changed. For example, the visual content capture rate may be increased to capture visual content at a higher frequency when events of interest are detected. For instance, visual content capture rate may be increased to be the same as the visual content playback rate (e.g., make the video content appear to be played with a 1× speed) and/or may be increased above the visual content playback rate (e.g., make the video content appear to be played with a 0.5× speed). The visual content capture rate may be changed automatically, such as based on event of interest detection. The visual content capture rate may be changed manually, such as based on a user interacting with a button (e.g., highlight button) on the image capture device.

In some implementations, the visual content capture rate may be changed and/or set based on visual content detection. Visual content detection may refer to detection of content within the visual content. Visual content detection may include identification of things within the visual content (e.g., face recognition, object recognition, scene recognition, emotion recognition), the quality and/or number of things within the visual content (e.g., number of faces, number of objects, level of emotion, amount of motion), and/or other characteristics relating to things within the visual content.

For example, the visual content capture rate may change based on detection of particular objects (e.g., persons, faces), and/or detection of motion within the visual content. For instance, the visual content capture rate may be increased to capture visual content at a higher frequency when person and/or faces are detected. For instance, visual content capture rate may be increased to be the same as the visual content playback rate (e.g., make the video content appear to be played with a 1× speed) and/or may be increased above the visual content playback rate (e.g., make the video content appear to be played with a 0.5× speed).

The visual content capture rate may be changed to match the amount and/or type of motion detected within the visual content. For example, detection of fast motion in the visual content may result in the visual content capture rate increasing more than detection of slow motion in the visual content. The visual content capture rate may be adjusted to match the speed of the motion detected within the visual content so that more images/video frames including depiction of the motion are captured. As another example, detection of a particular type of motion (e.g., jumping, falling, interacting with a device) may result in the visual content capture rate changing to a predefined visual content capture rate corresponding to the particular type of motion. The visual content capture rate may be adjusted in accordance with the predefined visual content capture rate so that different types of motion are captured using the corresponding/associated capture rates. Other changes in the visual content capture rate are contemplated.

In some implementations, other aspect(s) of the image capture device may change during capture of the visual content and/or the audio content. For example, an exposure rate of the image capture device may be changed during capture of the visual content to match the lighting conditions in which the visual content is being captured. Other aspects of operation for the image capture device may automatically adjusted during capture of the visual content and/or the audio content (e.g., based on analysis of the visual content, audio content, and/or metadata). Aspects of operation for the image capture device may include one or more aspects of operation for one or more processors of the image capture device, one or more image sensors of the image capture device, one or more optical elements of the image capture device, and/or other aspects of operation for the image capture device. In some implementations, aspects of operation for the image capture device may include one or more of a capture mode, a capture resolution, a capture framerate, a capture field of view, a capture visual processing, a capture shutter speed, a capture exposure rate, and/or other aspects of operation for the image capture device.

A capture mode may include manual modes and/or automatic modes. In some implementations, a capture mode may include an automatic capture mode. An image capture device operating in an automatic capture mode may capture visual content (e.g., images, videos) based on detection of particular visuals and/or audio. For example, an image capture device operating in an automatic capture mode may capture video content based on detection of a particular object, a particular action, a particular machine-readable optical code, a particular sound, and/or detection of other things/activity/events. A capture resolution may define the resolution at which visual content is captured. A capture frame rate may define the frame rate at which visual content is captured. A capture field of view may define the extent of an environment observable by an image capture device from a position/orientation. A capture visual processing may define visual manipulation performed by an image capture device during and/or after capture of visual content. A capture shutter speed may define the shutter speed at which visual content is captured. A capture exposure rate may define the exposure rate at which visual content is captured. Other aspects of operation for the image capture device(s) are contemplated.

For example, one or more aspects of operation for the image capture device may include image resolution, image framerate, camera field of view, zoom, image projection, image color balance, tonal curve, exposure compensation, color saturation, contrast, sharpening, softening, gamma, ISO limit, video stabilization, shutter speed, encoding parameters (e.g., codec type (H.264, HEVC), I-frame interval, macroblock size, deblocking filter, QP, capture timing (e.g., auto, interval, continuous, loop), and/or other aspects.

In some implementations, one or more aspects of operation for the image capture device may include aspects of operation for one or more microphone/sound sensors of the image capture device. For example, one or more aspects of operation for the image capture device may include number of channels, sample rate, compression format (e.g., AAC, MP3), averaging/filter window duration, and/or other aspects.

The audio content component 104 may be configured to capture the audio content during one or more audio capture durations. An audio capture duration may refer to a time duration in which audio content is captured. An audio capture duration may extend from an audio capture start point to an audio capture end point. An audio capture duration may span a time duration that starts at the audio capture start point and ends at the audio capture end point. An audio capture duration may be different from/shorter than a visual capture duration.

Capturing audio content during an audio capture duration may include recording, storing, and/or otherwise capturing the audio content for use in generating video content. For example, during an audio capture duration, the audio content component 104 may use the sound output signal generated by the sound sensor 16 and/or the audio information conveyed by the sound output signal to record, store, and/or otherwise capture the audio content for use in generating video content. The audio content component 104 may use the audio output signal generated by the sound sensor 16 and/or the audio information conveyed by the sound output signal during an audio capture duration to record, store, and/or otherwise capture the audio content for use in generating video content. For instance, the audio content component 104 may store, in the electronic storage 13 and/or other (permanent and/or temporary) electronic storage medium, information (e.g., the audio information) defining the audio content based on the sound output signal generated by the sound sensor 16 and/or the audio information conveyed by the sound output signal during the audio capture duration. Information defining the captured audio content may be stored in one or more audio tracks.

An audio track may be different from a visual track in which information defining the captured visual content may be stored. In some implementations, information defining audio content captured during different audio capture durations may be stored in different audio tracks. In some implementations, sources of the captured audio content (e.g., a person speaking, background/ambient noise, sound from an activity) may be identified, and information defining audio content captured from different sources may be stored in different audio tracks. In some implementations, different types of voices and/or speech may be stored in different audio tracks. For example, sounds of one or more persons laughing, crying, screaming, shouting, and/or otherwise speaking for short durations of time may be stored in different audio track from sounds of one or more persons speaking for longer durations of time. For instance, narration by one or more persons may be stored in one or more audio tracks different from other sounds.

In some implementations, capture of different types of sounds/audio may be indicated by user input. For example, an image capture device may include/provide one or more options (e.g., physical button(s), virtual button(s) presented on a display), which may be activated by a user to indicate the type of sounds/audio being captured. For instance, an image capture device may include one or more narration options (e.g., narration button(s)), which may be activated by a user to indicate that narration/narration of particular type is being captured. Other types of options to indicate other types of sounds/audio are contemplated.

Capture of the audio content by the audio content component 104 may be separate from use of the audio content for other purposes, such as monitoring and/or analyzing the audio content for detecting one or more moments of interest. For example, a feed of audio content conveyed by the sound output signal may be monitored, analyzed, and/or otherwise used to detect the occurrence of one or more events of interest. One or more events of interest may be captured within the audio content (e.g., the audio content including sounds of events of interest and/or sounds indicating occurrences of events of interest).

In some implementations, one or more audio capture durations may be determined based on detection of one or more events of interest. For example, an audio capture start point and/or an audio capture end point of an audio capture duration may be set based on detection of an event of interest. For instance, an audio capture start point may be set to coincide with or precede the beginning of a moment of interest and an audio capture end point may be set to coincide with or follow the end of the moment of interest. Audio content generated by the sound sensor 16 may be temporarily stored for detection of events of interest (e.g., in one or more buffers). Audio content generated by the sound sensor 16 outside an audio capture duration may be deleted and/or otherwise removed from electronic storage (e.g., after monitoring/analysis of the audio content).

In some implementations, one or more audio capture durations may be determined based on detection of one or more highlight moments. A highlight moment may refer to a moment at which a highlight event occurs. A highlight event may refer to an exciting, interesting, and/or an important event, such as a high point or a climax of an activity being performed by one or more users. A highlight event may be an event of interest. A highlight event/moment may be detected based on analysis of the visual content (e.g., blur detection, color analysis, face recognition, histogram analysis, object recognition, activity recognition, scene recognition, salience detection, emotion recognition), analysis of the audio content (e.g., voice recognition, command recognition, activity recognition, emotion detection), analysis of user input (e.g., a user interacting with a highlight button), analysis of metadata relating to the visual content/audio content (e.g., telemetry data, GPS data, IMU data, speed data, velocity data, acceleration data, rotation data), and/or other information. In some implementations, metadata may be stored in a separate metadata track of the content container (e.g., mp4 container including visual content, and/or audio content). Example implementations of metadata storage are described in U.S. patent application Ser. No. 16/131,542 filed Sep. 14, 2018, and entitled "APPARATUS AND METHODS FOR MANIPULATING MULTICAMERA CONTENT USING CONTENT PROXY" (the "'542 Application"), U.S. patent application Ser. No. 15/458,794 filed Mar. 14, 2017, and entitled "APPARATUS AND METHODS FOR EMBEDDING METADATA INTO VIDEO STREAM" (the "'794 Application"), U.S. patent application Ser. No. 14/920,427 filed Oct. 22, 2015, and entitled "APPARATUS AND METHODS FOR EMBEDDING METADATA INTO VIDEO STREAM" (the "'427 Application"), U.S. patent application Ser. No. 15/924,904 filed Mar. 19, 2018, and entitled "STORAGE OF METADATA AND IMAGES" (the "'904 Application"), and U.S. patent application Ser. No. 15/891,136 filed Feb. 7, 2018, and entitled "APPARATUS AND METHODS FOR EMBEDDING METADATA INTO VIDEO STREAM" (the "'136 Application"), each of the foregoing being incorporated herein by reference in its entirety. Metadata may be stored using GoPro Metadata Format (GPMF), such as described in the above-mentioned '542 Application, '794 Application, '427 Application, '904 Application, and/or '136 Application.

Examples of metadata may include: telemetry data (such as motion data, velocity data, and acceleration data) captured by sensor(s) on the image capture device; location information captured by a GPS receiver of the image capture device; compass heading information; altitude information of the image capture device; biometric data such as the heart rate of the user, breathing of the user, eye movement of the user, body movement of the user; vehicle data such as the velocity or acceleration of the vehicle carrying the image capture device; the brake pressure of the vehicle, or the rotations per minute (RPM) of the vehicle engine; and/or environment data such as the weather information associated with the capture of the video.

For example, a highlight event/moment may include events of interest within the captured video, captured scenes associated with certain metadata (such as an above threshold altitude or speed), captured scenes associated with certain image capture device and/or environment characteristics, and/or other content. In some implementations, the metadata may be captured by the image capture device during capture of the video and/or may be retrieved from one or more other metadata sources (e.g., after capture of the video). In some implementations, metadata associated with the video may be used to identify highlight events/moments without relying on image processing techniques or manual highlight detection by a user.

In some implementations, metadata may include information about the video/the capture of the video, the content of the video, the image capture device used to capture the video, the environment or setting in which the video is captured, and/or other information associated with the capture of the video. For example, metadata may include acceleration data representative of the acceleration of an image capture device carried by a user as the user captures a video while snowboarding down a mountain. Such acceleration metadata may facilitate identification of highlight events/moments including a sudden change in acceleration during the capture of the video. Sudden changes in acceleration during the capture of the video may indicate that the user has performed a jump or crashed. Motion data associated with a high altitude, a mountain location, and a parabolic upward and then downward velocity may be identified as a "snowboarding jump" while motion data associated with a low altitude, a water location, and a parabolic upward and then downward velocity may be identified as a "surfing jump." A sudden slowdown in velocity and accompanying negative acceleration may be identified as a "crash". Identification of other events/moments are contemplated.

One or more criteria may be used to identify highlight events/moments. Example criteria for identifying highlight events/moments may include: a greater than threshold change in acceleration or velocity within a pre-determined period of time, a maximum or above-threshold velocity or acceleration, a maximum or local maximum altitude, a maximum or above-threshold heart rate or breathing rate of a user, a maximum or above-threshold audio magnitude, a capture location being within a predetermined threshold distance from a pre-determined location, a threshold change in or pre-determined orientation of the image capture device, a proximity to another image capture device or location, a capture time within a threshold of a pre-determined time, a pre-determined environmental condition (such as a particular weather event, a particular temperature, a sporting event, a human gathering, or any other suitable event. Other criteria for identifying highlight events/moments are contemplated.

In some implementations, highlight events/moments may be identified based on an interest curve. An interest curve may characterize different levels of interesting things captured within the video at different moments based on values of the interest curve. In some implementations, highlight events/moments may be identified based on the shape of the interest curve. Using shape of the interest curve to determine highlight moments may facilitate identification of moments of different qualities in terms of values of the interest curve. For example, highlight events/moments may be identified to at a local maximum, a global maximum, a local minimum, and/or a global minimum of the interest curve. As another example, highlight events/moments may be identified at portions of the interest curve that have values higher/lower than a threshold hold. As another example, highlight events/moments may be identified at leveled portions of the interest curve—portions of the interest curve that maintains a certain range of interest values over a certain range of time.

In some embodiments, highlight events/moments may be identified based on a reverse of identification of non-highlight events/moments. Analysis of the visual content, analysis of the audio content, analysis of user, analysis of metadata relating to the visual content/audio content, and/or other information may be used to identify when highlight events/moments do not occur. For example, capture of video associated with a below-threshold movement, a below-threshold luminosity, a lack of faces or other recognizable objects within the visual content, audio content that does not include dialogue or other notable sound effects may be used to identify non-highlight events/moments. The inverse of the non-highlight events/moments portions may be identified as including or potentially including highlight events/moments.

The audio capture duration may be determined to include the highlight moment, moments surrounding the highlight moment, and/or other moments. For example, based on detection of a highlight moment, an audio clip around the highlight moment may be captured (e.g., for later edit/playback).

In some implementations, the extents of the duration captured around the highlight moment (a duration preceding the highlight moment, a duration following the highlight moment) may be determined based on the type of activity and/or the type of action being performed at the highlight moment. A type of activity may refer to a category of the overall actions that may be performed by one or more persons, such as a recreational activity, a sporting activity, a work activity, a social activity, a travel activity, a specific type of activity (e.g., hiking activity, biking activity, skiing activity, surfing activity), and/or other activities. An action may refer to an act or a thing that may occur during an activity. An action may be general to different types of activities (e.g., standing, running, jumping, falling, crashing) or may be specific to one or more certain types of activities (e.g., hitting a ball, scoring a point in a game). In some implementations, the same type of action for different types of activities may correspond to different audio capture durations. For example, the extents of the duration captured around the highlight moment including a falling action in a basketball activity may be different from the extents of the duration captured around the highlight moment including a falling action in a biking activity.

In some implementations, other information may be used to detect occurrences of events of interest. For example, location of the image capture device, motion of the image capture device, and/or other metadata/telemetry associated with the image capture device may be used to detect occurrences of events of interest. Detection of occurrences of events of interest may be used to determine visual capture durations and/or audio capture durations.

In some implementations, the audio capture duration may be determined based on the visual capture duration and/or other information. The audio capture duration may be determined such that sufficient audio content is captured to provide audio for playback of the captured visual content. For example, a user may wish to generate video content having a progress length of 10 seconds. The audio capture duration may be set to be 10 seconds to provide audio for playback of the entirety of the progress length of the video content. The audio capture duration may be set to be less than 10 seconds to provide audio for playback of one or more portions of the progress length of the video content.

For example, a user may set the progress length of the video content to be generated to be 10 seconds. The video content may have a visual content playback rate of 30 video frames per second, and the visual content for the video content may be captured at a visual content capture rate of 1 video frame per second. To capture sufficient visual content (e.g., video frames) to generate 10 seconds of video content (300 video frames), the visual capture duration may be set to be 300 seconds. The audio capture duration may be set to 10 seconds to capture audio content for the entire 10 seconds of the video content. The audio capture duration of 10 seconds may be set for one continuous duration. For example, the audio capture duration may span the first 10 seconds of the 300-second visual capture duration, the last 10 seconds of the 300-second visual capture duration, or a 10-second portion of the 300-second visual capture duration.

The audio capture durations may be staggered to capture different portions of audio content within the visual capture duration. The total audio capture duration may be segmented into multiple audio capture duration segments of equal or different lengths. The multiple audio capture duration segments may be equally or unequally arranged within the visual capture duration. For instance, referring to the example above, the audio capture duration of 10 seconds may be split into two audio capture durations of 5 seconds. The two audio capture durations of 5 seconds may be located within the visual capture duration of 300 seconds. For example, the first audio capture duration of 5 seconds may begin with the visual capture duration. Once 5 seconds of audio content has been captured, audio content capture may be paused until enough visual content has been captured for the 5 seconds of captured audio content. The duration to capture enough visual content (150 video frames) for the 5 seconds of captured audio content may be 150 seconds. The second audio capture duration of 5 seconds may begin after the 150 seconds. Thus, the audio capture durations may be staggered within the visual capture duration. Other staggering of audio capture durations are contemplated.

In some implementations, an audio capture duration may precede a visual capture duration. For example, a user may provide narration for video content to be generated prior to capture of the visual content. The visual capture duration may be set based on the length of the provided narration. For example, the visual capture duration may be set so that sufficient visual content is captured to generate video frames for playback with the provided narration.

In some implementations, an audio capture duration may follow a visual capture duration. For example, a user may provide narration for video content to be generated after capture of the visual content. The provided narration may be blended with other audio content captured during/with the capture of the visual content. In some implementations, the visual content playback rate may be adjusted to match the duration of captured visual content playback with the duration of captured audio content playback.

In some implementations, certain types of sounds/audio may be prioritized for capture. For example, human speech and/or laughing may be prioritized over non-human sounds/audio. Louder sounds may be prioritized over quieter sounds. Other prioritizations of different types of sounds/audio are contemplated.

Prioritization of sounds/audio may result in captured audio content being replaced or blended with other (higher prioritized/ranked) audio content. For example, referring to example above of capturing audio content during the first 5 seconds of visual capture duration, ambient/background sound may be included within the captured audio content. The audio content generated by the sound sensor 16 may be monitored and/or analyzed to detect higher prioritized/ranked sound/audio while audio capture is paused (between 5 second mark and 150 second mark). Based on detection of audio content (e.g., human speech, laughing) that has higher priority/higher ranking than the captured audio content, the higher prioritized/higher ranked audio content may be captured (e.g., moved from buffer into more permanent electronic storage). The higher prioritized/higher ranked audio content (e.g., human speech, laughing) may replace or be blended with the lower prioritized/lower ranked audio content (e.g., ambient/background sound) in generation of the video content.

Figure 4A:
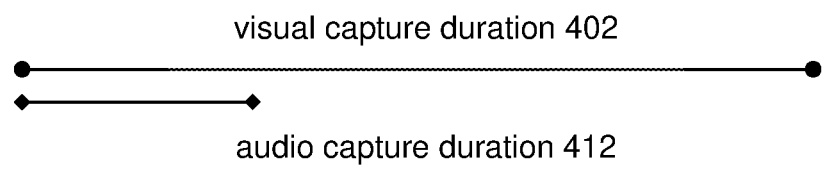
FIGS. 4A-4D illustrate example visual capture durations and example audio capture durations.

FIGS. 4A-4D illustrate example visual capture durations and example audio capture durations. FIG. 4A illustrates a visual capture duration 402 and an audio capture duration 412. The audio capture start point of the audio capture duration 412 may coincide (located at the same time point) with the visual capture start point of the visual capture duration 402 and the audio capture end point of the audio capture duration 412 may precede (occur before) the visual capture end point of the visual capture duration 402.

Figure 4B:
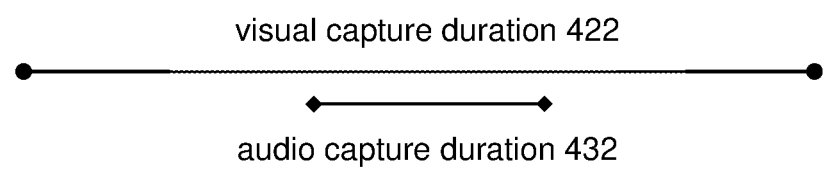

FIG. 4B illustrates a visual capture duration 422 and an audio capture duration 432. The audio capture start point of the audio capture duration 432 may follow (occur after) the visual capture start point of the visual capture duration 422 and the audio capture end point of the audio capture duration 432 may precede the visual capture end point of the visual capture duration 422.

Figure 4C:
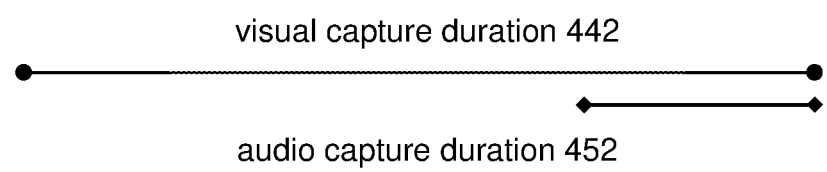

FIG. 4C illustrates a visual capture duration 442 and an audio capture duration 452. The audio capture start point of the audio capture duration 452 may follow the visual capture start point of the visual capture duration 442 and the audio capture end point of the audio capture duration 452 may coincide with the visual capture end point of the visual capture duration 442.

Figure 4D:
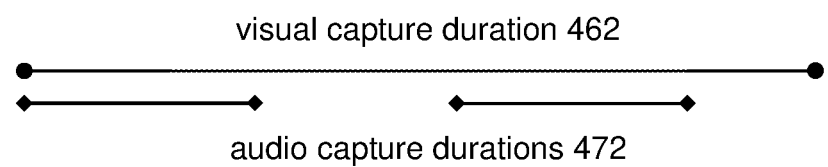

FIG. 4D illustrates a visual capture duration 462 and audio capture durations 472. The audio capture start point of the first of the audio capture durations 472 may coincide with the visual capture start point of the visual capture duration 462 and the audio capture end point of the first of the audio capture durations 472 may precede the visual capture end point of the visual capture duration 462. The audio capture start point of the second of the audio capture durations 472 may follow the visual capture start point of the visual capture duration 462 and the audio capture end point of the second of the audio capture durations 472 may precede the visual capture end point of the visual capture duration 462.

In some implementations, the audio content may be captured based on identification of one or more depictions of interest within the visual content and/or other information. For example, referring to FIG. 4B, the timing/arrangement of the audio capture duration 432 within the visual capture duration 422 may be determined based on identification of depiction(s) of interest within the visual content (e.g., captured during the visual capture duration 422, captured outside the visual capture duration 422).

In some implementations, the audio content may be captured based on identification of one or more sounds of interest within the audio content and/or other information. For example, referring to FIG. 4C, the timing/arrangement of the audio capture duration 452 within the visual capture duration 442 may be determined based on identification of sound(s) of interest within the audio content (e.g., occurring during the visual capture duration 442, occurring outside the visual capture duration 442).

In some implementations, the audio content may be captured based on activation of one or more options (e.g., narration option) of the image capture device. For example, referring to FIG. 4D, the timing of one or both of the audio capture durations 472 within the visual capture duration 462 may be determined based on a user of the image capture device activating one or more narration options included in/provided by the image capture device.

The video content component 106 may be configured to generate video content of one or more videos. The video content component 106 may generate the video content based on captured visual content, captured audio content, and/or other information. For example, the video content generated by the video content component 106 may include the captured visual content, the captured audio content, and/or other content. The video content may define visual content viewable as a function of progress through a progress length of the video content. The captured visual content may be defined within one or more video frames of the video content. That is, the visual content captured by the visual content component 102 during the visual capture duration(s) may be used to generate video frame(s) of the video content. The visual content captured by the visual content component 102 may form the visual content of the video frame(s) of the video content. The visual content captured by the visual content component 102 may be used to generate the visual content of the video frame(s) of the video content.

The captured audio content used to generate the video content may span a shorter duration of time than the duration of time spanned by the captured visual content used to generate the video content. That is, the visual capture duration may extend over a time span that is longer than the time span extended over by the audio capture duration. In some implementation, the captured audio content may include multiple captured audio content portions, such as the two audio content portions (captured during the audio capture durations 472) shown in FIG. 4D.

The captured audio content may provide audio for playback of at least some of the video frames. That is, the audio content captured by the audio content component 104 during the audio capture duration(s) may be used to generate audio/sound of the video content. Such snippet(s) of sound/audio may provide audio for the entire progress length (all video frames) of the video content or for one or more portions (some video frames) of the video content.

Figure 5A:
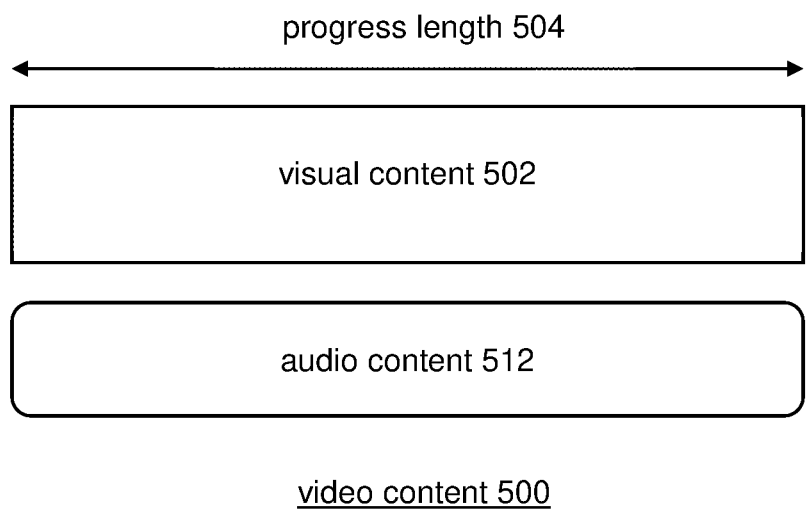
FIGS. 5A-5G illustrate example synchronization of visual content with audio content.

Arrangement of the duration of the captured visual content and the duration of the captured audio content may be referred to as synchronization of visual content with audio content. FIGS. 5A-5D illustrate example synchronization of visual content with audio content. In FIG. 5A, video content 500 may include visual content 502 synchronized with audio content 512. The visual content 502 and the audio content 512 may have the same progress length 504. The audio content 512 may provide audio for playback of the entirety of the visual content 502.

Figure 5B:
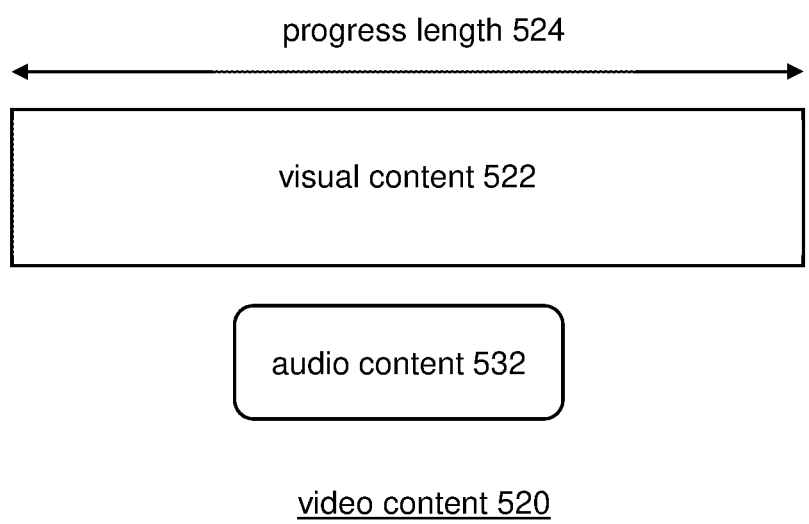

In FIG. 5B, video content 520 may include visual content 522 synchronized with audio content 532. The visual content 522 may have a progress length 524 and the audio content 532 may have a shorter progress length. The audio content 532 may provide audio for playback of a portion (middle portion) of the visual content 522.

Figure 5C:
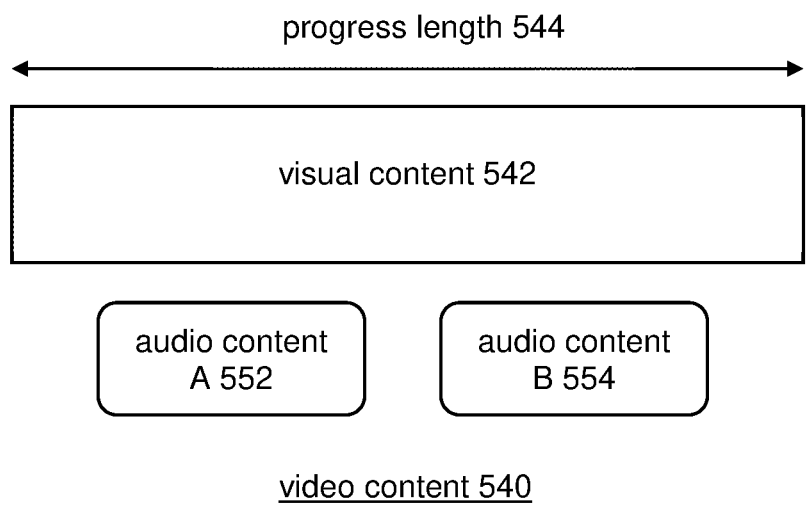

In FIG. 5C, video content 540 may include visual content 542 synchronized with audio content 552, 554. The visual content 542 may have a progress length 544 and the audio content 552, 554 may have shorter progress lengths. The progress lengths of the audio content 552, 554 may be the same. The audio content 552, 554 may provide audio for playback of two portions of the visual content 542. The audio content A 552 may provide audio for playback of a portion of the visual content 542 within the first half of the progress length 544 and the audio content B 554 may provide audio for playback of a portion of the visual content 542 within the second half of the progress length 544.

Figure 5D:
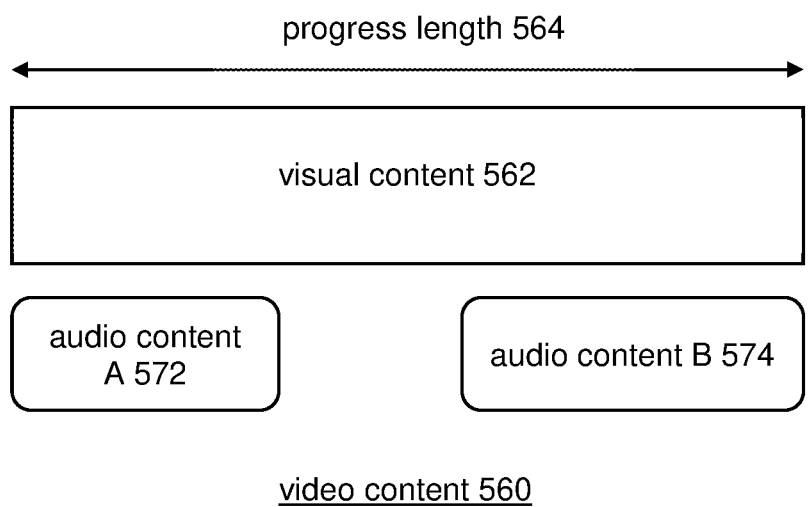

In FIG. 5D, video content 560 may include visual content 562 synchronized with audio content 572, 574. The visual content 562 may have a progress length 564 and the audio content 572, 574 may have shorter progress lengths. The progress lengths of the audio content 572, 574 may be different. The audio content 572, 574 may provide audio for playback of two portions of the visual content 562. The audio content A 572 may provide audio for playback of a portion of the visual content 562 at the beginning of the progress length 564 and the audio content B 574 may provide audio for playback of a portion of the visual content 562 at the end of the progress length 564. Other synchronizations of visual content with audio content are contemplated.

Figure 5E:
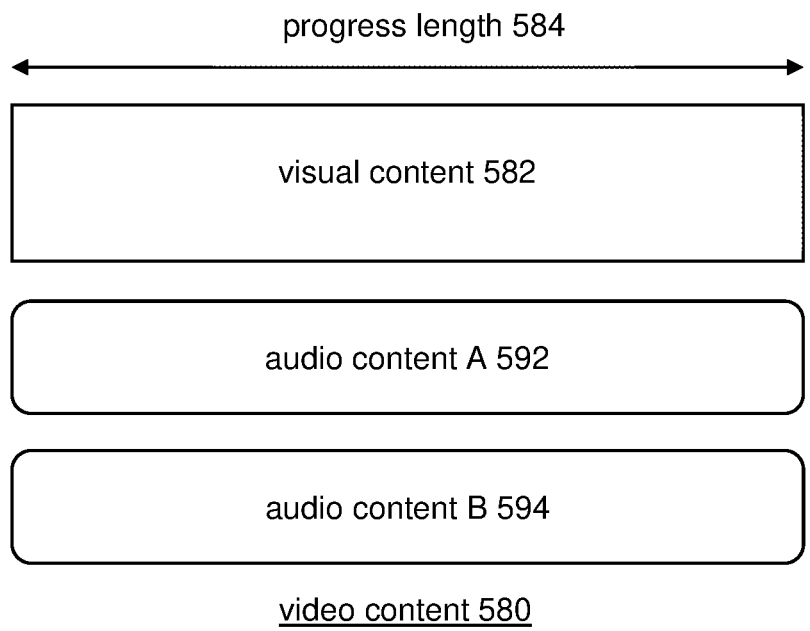

In some implementations, multiple captured audio content may be mixed to provide audio for playback of at least some of the video frames. Mixing of multiple audio content may include outputting of the multiple audio content at the same time. For example, referring to FIG. 5E, video content 580 may include visual content 582 synchronized with audio content 592, 594. The visual content 582 and the audio content 592, 594 may have the same progress length 584. The audio content 592, 594 may provide audio for playback of the entirety of the visual content 582. The audio content 592, 594 may be stored within the same audio track or different audio tracks of the video content 580.

Figure 5F:
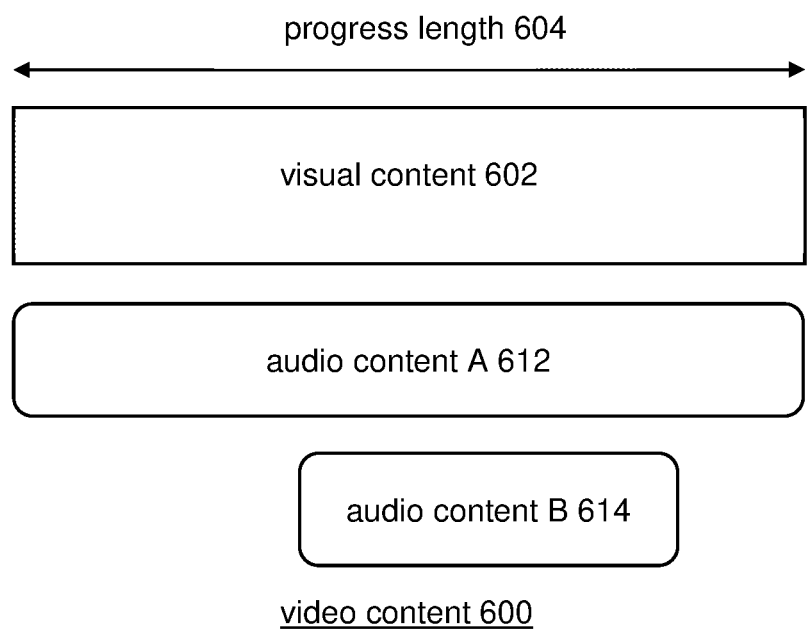

Referring to FIG. 5F, video content 600 may include visual content 602 synchronized with audio content 612, 614. The visual content 602 and the audio content A 612 may have the same progress length 604. The audio content B 614 may have a shorter progress length. The audio content A 612 may provide audio for playback of the entirety of the visual content 604. The audio content B 612 may provide audio for playback of a portion the visual content 604 (e.g., subset of video frames defining the visual content 602). The audio content 612, 614 may be stored within the same audio track or different audio tracks of the video content 600.

Figure 5G:
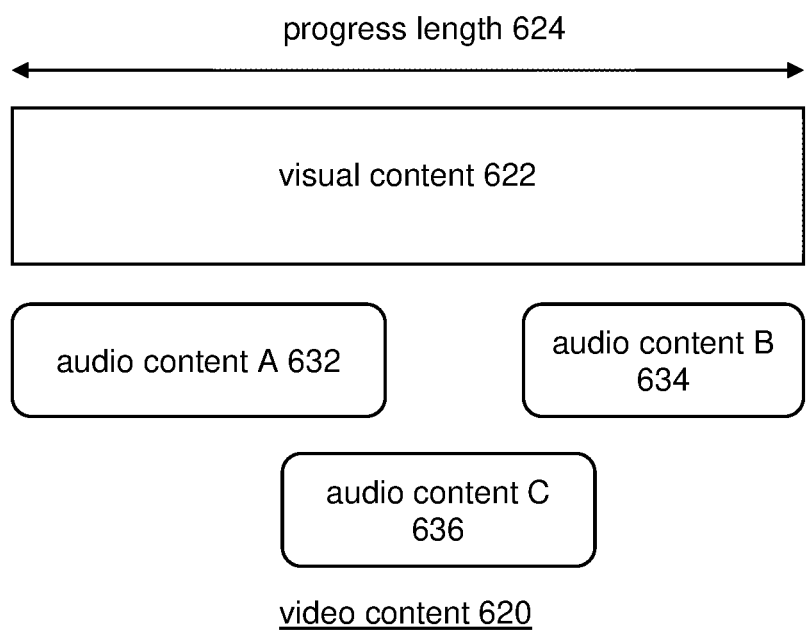

Referring to FIG. 5G, video content 620 may include visual content 622 synchronized with audio content 632, 634, 636. The visual content 602 may have a progress length 624. The audio content 632, 634, 636 may have shorter progress lengths. The audio content 632, 634, 636 provide audio for playback of different portions the visual content 622 (e.g., subsets of video frames defining the visual content 622). The audio content 632, 634, 636 may be stored within the same audio track or different audio tracks of the video content 620.

In some implementations, mixing of multiple captured audio content may be determined based on the types of sounds/audio within the captured audio content. Mixing of multiple captured audio content may include identification of types of sounds/audio within the captured audio content, and determination as to whether the multiple captured audio content may be mixed based on the identified types. For example, audio content of different types may be allowed to be mixed while audio content of the same type may not be allowed to be mixed. For instance, audio content including voice/speech may be allowed to be mixed with audio content including non-voice/non-speech while audio content including voice/speech may not be allowed to be mixed with other audio content including voice/speech. As another example, audio content of background/ambient sounds may be allowed to be mixed if they are captured from similar types of location while audio content of background/ambient sounds may not be allowed to be mixed if they are captured from different types of location. For instance, multiple audio content of background/ambient sounds captured in a forest location may be allowed to be mixed while multiple audio content of background/ambient sounds separately captured in an urban location and a beach location may not be allowed to be mixed.

In some implementation, the volume of multiple audio content may be normalized. In some implementation, the volume of multiple audio content may be adjusted to provide different emphases of the audio content. For example, referring to FIG. 5E, the volume of the audio content A 592 may be larger than the volume of the audio content B 594 to emphasize the audio content A 592 within the video content 580. The volume of the audio content 592, 594 may be changed based on the type of sounds/audio within the audio content 592, 594. Changing of volume of audio content may include identification of types of sounds/audio within the audio content, and determination as to how the volume may be changed based on the identified types. For example, volume of one or both of the audio content 592, 594 may be changed to emphasize speech over other types of sound/audio. For instance, the audio content 592, 594 may be stored in separate tracks and the volume of the track with/during speech may be increased and/or the volume of the track without speech may be decreased.

In some implementations, the volume of audio content may be adjusted to provide fade effects. A fade effect may refer to changing the volume of audio content gradually (volume increased/decreased gradually). For example, referring to FIG. 5B, the volume of the audio content 532 may be adjusted so that the playback of the audio content 532 starts at a low volume/zero volume and increases as a function of the progress length of the audio content 532/the progress length 524. The volume of the audio content 532 may be adjusted so that the playback of the audio content 532 decreases to a low volume/zero volume towards the end of the progress length of the audio content 532. As another example, referring to FIG. 5G, the volume of the audio content 632, 634, 636 may be adjusted so that individual audio content 632, 634, 636 start at a low volume/zero volume and/or ends at a low volume/zero volume. Such adjustment of the volumes may result in cross-fade of the audio content 632, 634, 636. Other adjustments of volume of audio content are contemplated.

In some implementation, the video content generated by the video content component 106 may include video content of one or more time-lapse videos. A time-lapse video may have a visual content playback rate that is faster than a visual content capture rate.

In some implementations, visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture). Partial spherical visual content may be referred to as panoramic visual content.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
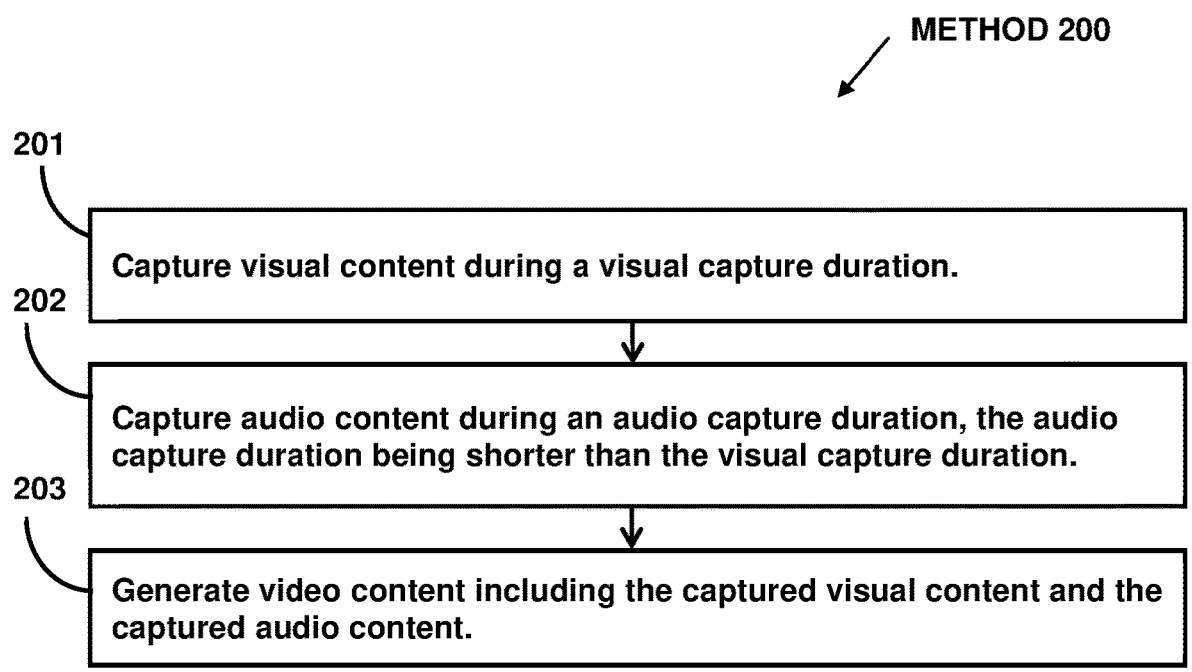
FIG. 2 illustrates an example method for generating videos with short audio.

FIG. 2 illustrates method 200 for generating videos with short audio. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include an image sensor, a sound sensor, and/or other components. The image sensor may be configured to generate a visual output signal conveying visual information based on light that becomes incident thereon. The visual information may define visual content. The sound sensor may be configured to generate a sound output signal conveying audio information based on sound received by the sound sensor. The audio information may define audio content.

At operation 201, the visual content may be captured during a visual capture duration. The visual capture duration may extend from a visual capture start point to a visual capture end point. In some implementation, operation 201 may be performed by a processor component the same as or similar to the visual content component 102 (Shown in FIG. 1 and described herein).

At operation 202, the audio content may be captured during an audio capture duration. The audio capture duration may extend from an audio capture start point to an audio capture end point. In some implementations, operation 202 may be performed by a processor component the same as or similar to the audio content component 104 (Shown in FIG. 1 and described herein).

At operation 203, video content of a video may be generated. The video content may include the captured visual content and the captured audio content. The captured visual content may be defined within video frames of the video content. The captured audio content may provide audio for playback of at least some of the video frames. In some implementations, operation 203 may be performed by a processor component the same as or similar to the video content component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
    a housing;
    an image sensor carried by the housing and configured to generate a visual output signal conveying visual information based on light that becomes incident thereon, the visual information defining visual content;
    an optical element carried by the housing and configured to guide light within a field of view to the image sensor;
    a sound sensor carried by the housing and configured to generate a sound output signal conveying audio information based on sound received by the sound sensor, the audio information defining audio content; and
    one or more physical processors carried by the housing, the one or more physical processors configured by machine-readable instructions to:
        capture the visual content during a visual capture duration, the visual capture duration extending from a visual capture start point to a visual capture end point;
        capture the audio content during a first audio capture duration based on activation of an audio content capture option of the image capture device, the activation of the audio content capture option separately prompting the image capture device to capture the audio content from capture of the visual content, the first audio capture duration extending from a first audio capture start point to a first audio capture end point, the first audio capture duration being shorter than the visual capture duration; and
        generate video content of a time-lapse video, the video content of the time-lapse video including the captured visual content and the captured audio content, wherein the captured visual content is defined within video frames of the video content and the captured audio content provides audio for playback of at least some of the video frames such that the captured audio content provides playback for the video frames captured over a duration longer than the first audio capture duration;
        wherein the audio content is captured further during a second audio capture duration, the second audio capture duration extending from a second audio capture start point to a second audio capture end point, the captured audio content includes a first captured audio content portion captured during the first audio capture duration and a second captured audio content portion captured during the second audio capture duration, and the first captured audio content portion is mixed with the second captured audio content portion to provide the audio for playback of at least some of the video frames, wherein mixing of the first captured audio content portion and the second captured audio content portion is performed based on both the first capture audio content portion and the second captured audio content portion having been captured from a same type of location.

2. The image capture device of claim 1, wherein the first audio capture start point coincides with the visual capture start point and the first audio capture end point precedes the visual capture end point.

3. The image capture device of claim 1, wherein the first audio capture start point follows the visual capture start point and the first audio capture end point coincides with the visual capture end point.

4. The image capture device of claim 1, wherein the first audio capture start point follows the visual capture start point and the first audio capture end point precedes the visual capture end point.

5. The image capture device of claim 1, wherein the audio content is captured further based on identification of a depiction of interest within the visual content.

6. The image capture device of claim 1, wherein the audio content is captured further based on identification of a sound of interest within the audio content.

7. The image capture device of claim 1, wherein mixing of the first captured audio content portion and the second captured audio content portion is performed based on both the first captured audio content portion and the second captured audio content portion not including speech.

8. A method for generating videos, the method performed by an image capture device including one or more processors, an image sensor, and a sound sensor, the image sensor configured to generate a visual output signal conveying visual information based on light that becomes incident thereon, the visual information defining visual content, the sound sensor configured to generate a sound output signal conveying audio information based on sound received by the sound sensor, the audio information defining audio content, the method comprising:
    capturing the visual content during a visual capture duration, the visual capture duration extending from a visual capture start point to a visual capture end point;
    capturing the audio content during a first audio capture duration based on activation of an audio content capture option of the image capture device, the activation of the audio content capture option separately prompting the image capture device to capture the audio content from capture of the visual content, the first audio capture duration extending from a first audio capture start point to a first audio capture end point, the first audio capture duration being shorter than the visual capture duration; and
    generating video content of a time-lapse video, the video content of the time-lapse video including the captured visual content and the captured audio content, wherein the captured visual content is defined within video frames of the video content and the captured audio content provides audio for playback of at least some of the video frames such that the captured audio content provides playback for the video frames captured over a duration longer than the first audio capture duration;

wherein the audio content is captured further during a second audio capture duration, the second audio capture duration extending from a second audio capture start point to a second audio capture end point, the captured audio content includes a first captured audio content portion captured during the first audio capture duration and a second captured audio content portion captured during the second audio capture duration, and the first captured audio content portion is mixed with the second captured audio content portion to provide the audio for playback of at least some of the video frames, wherein mixing of the first captured audio content portion and the second captured audio content portion is performed based on both the first capture audio content portion and the second captured audio content portion having been captured from a same type of location.

9. The method of claim 8, wherein the first audio capture start point coincides with the visual capture start point and the first audio capture end point precedes the visual capture end point.

10. The method of claim 8, wherein the first audio capture start point follows the visual capture start point and the first audio capture end point coincides with the visual capture end point.

11. The method of claim 8, wherein the first audio capture start point follows the visual capture start point and the first audio capture end point precedes the visual capture end point.

12. The method of claim 8, wherein the audio content is captured further based on identification of a depiction of interest within the visual content.

13. The method of claim 8, wherein the audio content is captured further based on identification of a sound of interest within the audio content.

14. The method of claim 8, wherein mixing of the first captured audio content portion and the second captured audio content portion is performed based on both the first captured audio content portion and the second captured audio content portion not including speech.

* * * * *